UNITED STATES PATENT OFFICE.

CHARLES A. HOOPER, OF SAN FRANCISCO, CALIFORNIA.

IMPROVEMENT IN THE MANUFACTURE OF CIGAR-BOXES FROM REDWOOD.

Specification forming part of Letters Patent No. 145,735, dated December 23, 1873; application filed November 15, 1873.

*To all whom it may concern:*

Be it known that I, CHARLES A. HOOPER, of San Francisco city and county, State of California, have discovered and invented a Process for Rendering Redwood suitable for Manufacturing into Cigar-Boxes, and a new kind of Cigar-Box; and I do hereby declare the following description and accompanying drawings are sufficient to enable any person skilled in the art or science to which it most nearly appertains to make and use my said invention and discovery without further invention or experiment.

Heretofore it has been generally impracticable to manufacture a merchantable article of cigar-boxes of any kind of timber that grows in the United States, as cigars long packed in boxes made from such timber suffered deleterious effects. For this reason cigar-boxes are generally made of Spanish cedar—a very expensive timber imported from a foreign country.

I have discovered that the California redwood, (*Sequoia*,) when thoroughly steamed or boiled in water and then dried, will make cigar-boxes into which cigars can be packed for any length of time without suffering any deleterious effects whatever; but the cigars packed in boxes made of California redwood, (*Sequoia*,) so prepared, will be preserved free from mold or injury, with their aroma unaffected, and without deterioration of any kind, equally well as when packed in the boxes made of Spanish cedar.

However well seasoned the redwood may be, if it is not steamed or boiled, the cigars packed in boxes made of it will, in a short time, deteriorate in quality by changing in smell and taste, and often molding.

The redwood, when thus prepared, is, in some respects, superior to the Spanish cedar for cigar-boxes; it is less liable to warp, less liable to season-check, and is of less specific gravity.

The redwood can be steamed or boiled in any convenient manner, the only requisite being that the redwood shall be thoroughly saturated with hot water or steam.

By this means I am enabled to furnish a more suitable and cheaper material of which to make cigar-boxes than has been before used or known, and also to manufacture a new kind of cigar-box.

I am aware that steaming timber is one of the oldest and best-known modes of treating it with a view to hastening its seasoning and preparing it for ordinary use; but this process is never resorted to when timber already seasoned can be had, or when there is time to allow the timber to season by time.

It is not the purpose of my process to secure the seasoning of the redwood by coagulating the albumen and removing the sap; but it goes much further.

It is well known that the fine flavor of tobacco is easily destroyed by packing cigars in boxes of any ordinary wood. As before stated, boxes of perfectly-seasoned redwood will ruin cigars; and hence its use was entirely avoided by cigar-makers until the introduction of my new process, by which the same wood is rendered equal to the best Spanish cedar.

Having thus described my invention, what I claim, and desire to secure by Letters Patent, is—

Cigar-boxes made of California redwood, (*Sequoia*,) steamed or boiled, substantially as described, as a new manufacture.

In witness whereof I hereunto set my hand and seal.

CHARLES A. HOOPER. [L. S.]

Witnesses:
 GEO. W. STRONG,
 C. MILTON RICHARDSON.